INVENTORS
GORDON HILL
PAUL C. BAUER
BY Evans & McCoy
ATTORNEYS

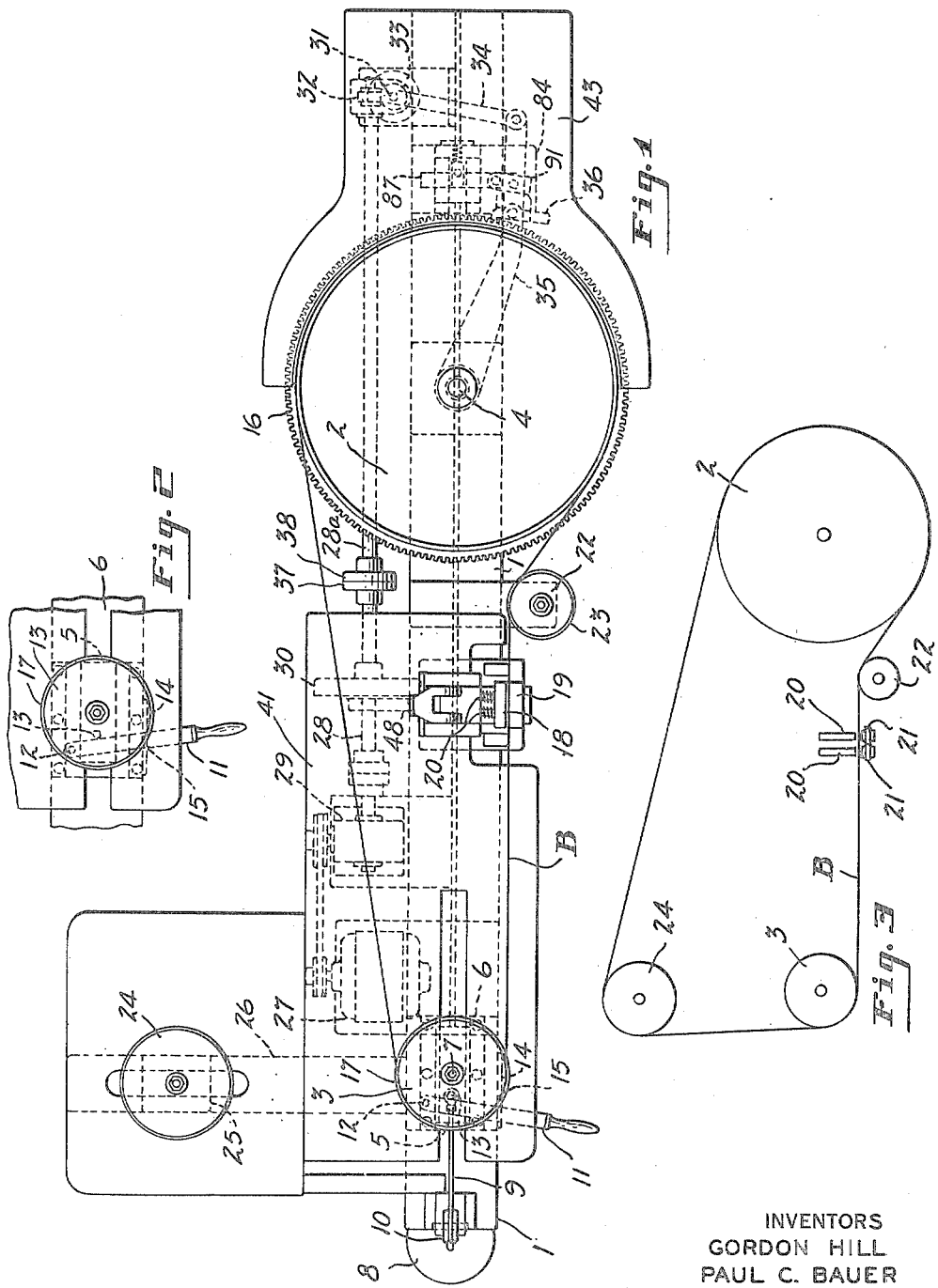

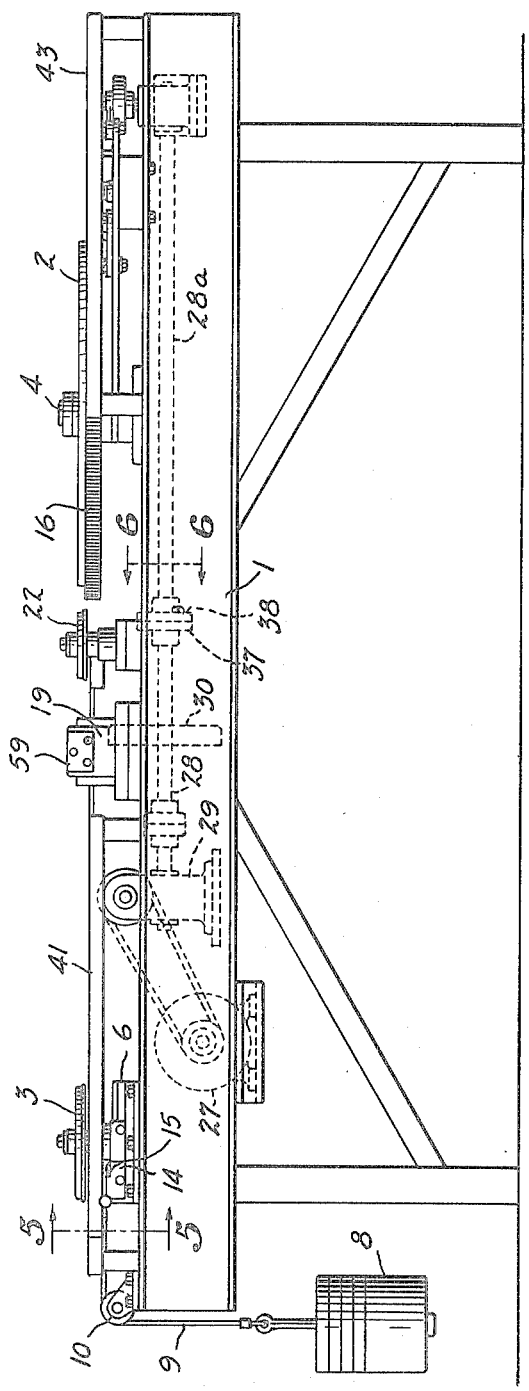

INVENTORS
GORDON HILL
PAUL C. BAUER
BY Evans & McCoy
ATTORNEYS

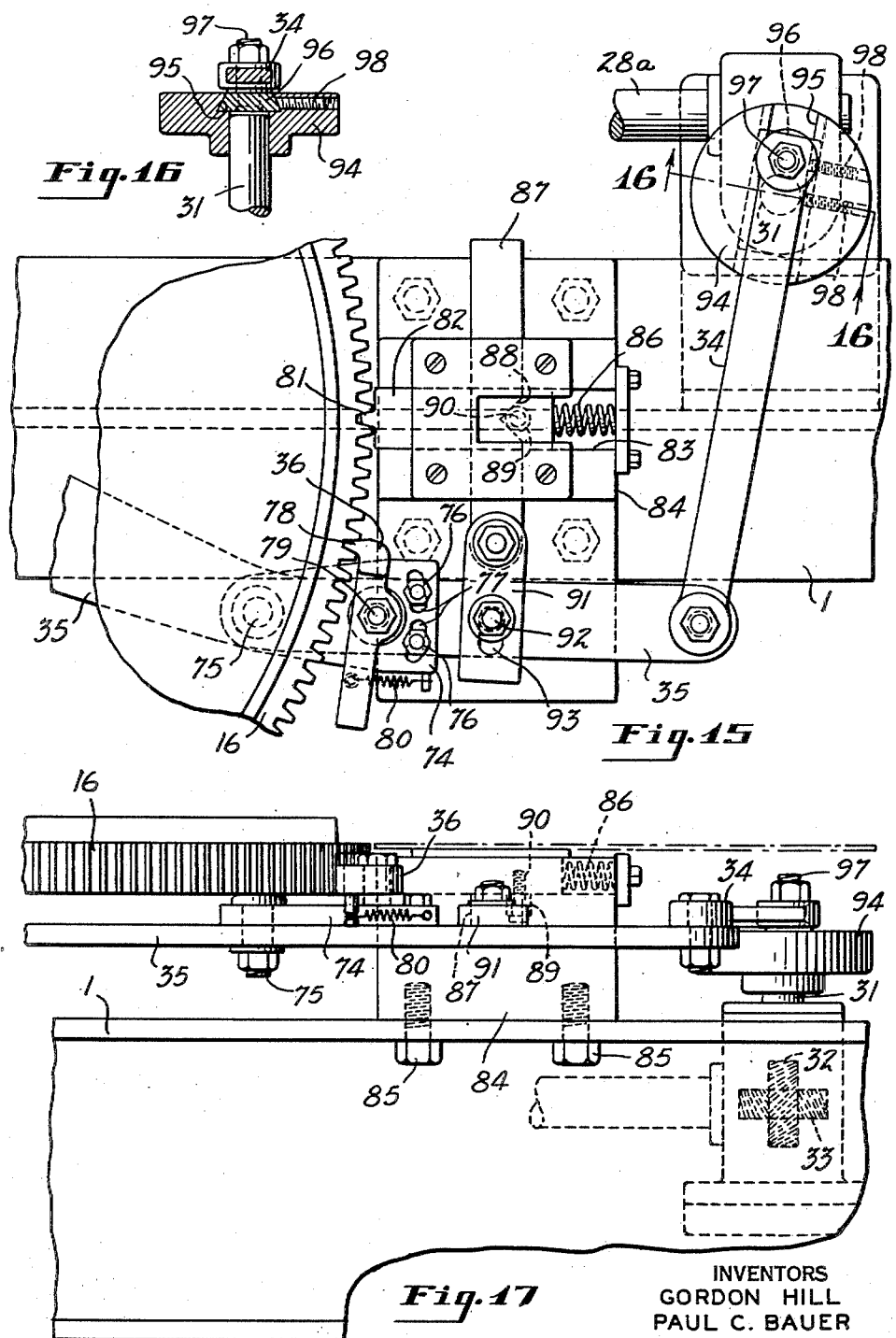

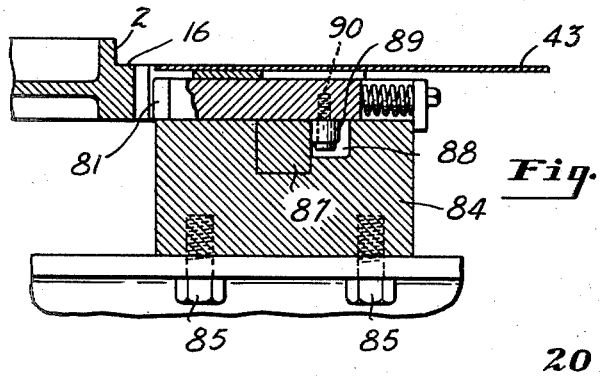
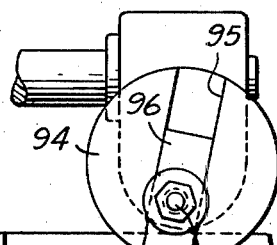
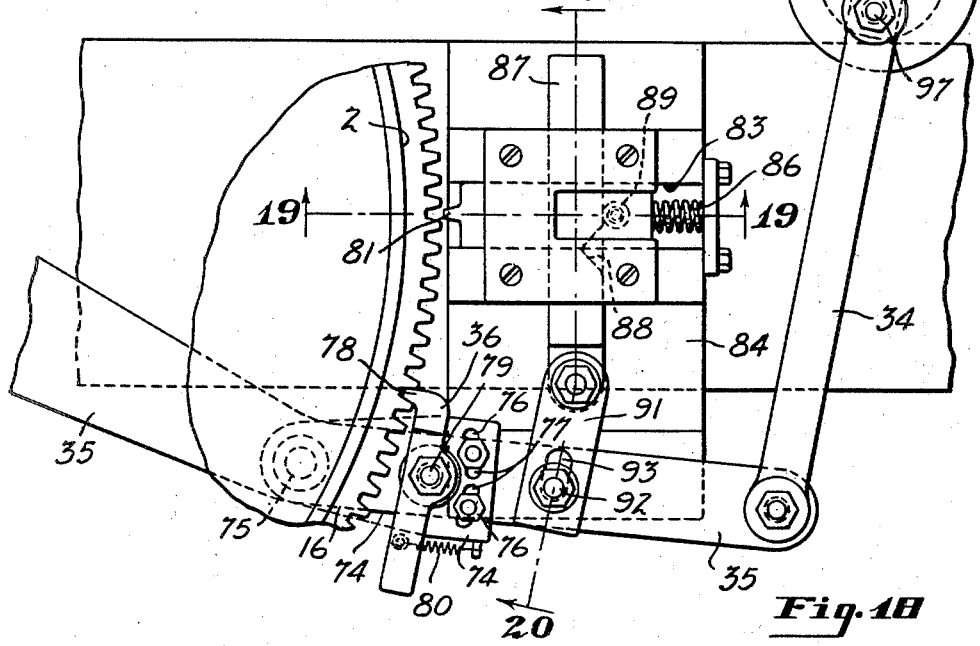
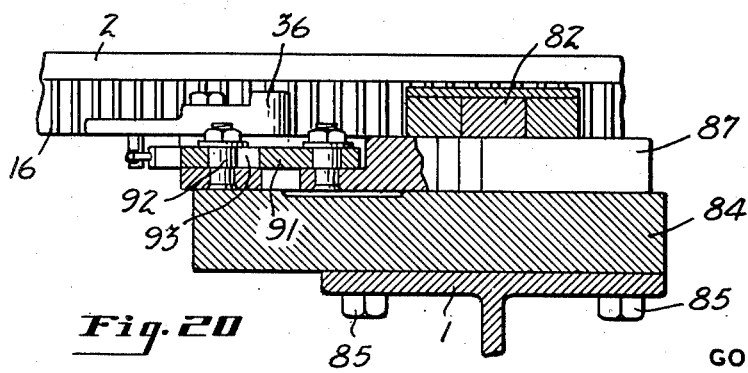

United States Patent Office 2,770,300
Patented Nov. 13, 1956

2,770,300

METHOD OF AND APPARATUS FOR FORMING SERRATED CUTTING EDGES ON SLICER BLADES

Gordon Hill and Paul C. Bauer, Davenport, Iowa, assignors, by mesne assignments, to Bettendorf Bakery Equipment Company, Bettendorf, Iowa, a corporation of Iowa Application November 29, 1951, Serial No. 258,952

9 Claims. (Cl. 164—50)

This invention relates to the manufacture of cutter blades, and to a method of and apparatus for forming serrated cutting edges on endless metal bands or strips such as the flexible spring steel bands or strips employed for the slicing blades of bread slicing machines, the invention being particularly applicable to the forming of serrated cutting edges on hardened steel strips or bands.

Cutter blades of bread slicing machines are usually provided with serrated edges which have cutting teeth formed between regularly spaced scallops of uniform width and depth. Such cutting edges have been made by successively forming the scallops by means of a grinding wheel. In the most usual method, a portion of the blade is sharply bowed and held at an angle to the grinding wheel, so that a scallop is ground in the bowed edge of the band. This method requires accurate indexing of the band between successive grinding operations. Another method of grinding is to grind one or more scallops directly into the edge of the band and this also requires accurate indexing between successive grinding operations. The rate of production of band blades by the grinding method has been slow and the cost of manufacturing has been high.

The present invention has for its object to provide a simple, rapid and inexpensive method of forming the serrated cutting edges of slicer blades.

In forming the cutting edges of slicer blades by the method of the present invention and with the apparatus herein illustrated, a metal strip of predetermined length is formed into an endless band by integrally joining its ends together by a suitable method such as by brazing and the band is then placed upon cylindrical pulleys that are spaced apart a proper distance to accommodate the band. One run of the band passes between a punch and its die and is guided so that an edge thereof is interposed between the punch and die, the punch and die being so shaped that a scallop of the desired length, depth and shape is formed in the edge of the band upon actuation of the punch, the band being accurately indexed between punching operations to properly space the scallops.

The punch and die are preferably of cylindrical form with opposed faces formed to provide circular cutting edges adapted to remove arcuate segments from the edge of the steel band. In order to provide increased speed of operation a plurality of punches operating simultaneously are preferably employed. In order to make unnecessary frequent replacements of punches and dies, the punches and dies are preferably mounted in their holders for angular adjustment about their axes to enable different portions thereof to be successively brought to cutting position and the punches and dies may also be reversible end for end in their holders.

The band supporting pulleys are preferably disposed horizontally and mounted so that the steel band can be quickly and easily dropped into place on the pulleys, one of the pulleys being adjustable to a position to loosely receive the band and being movable to apply tension to the band.

Reference should be had to the accompanying drawings forming a part of this specification, in which:

Figure 1 is a top plan view of a machine embodying the invention;

Fig. 2 is a fragmentary plan view of the movable band tensioning pulley;

Fig. 3 is a diagrammatic view showing the use of an auxiliary pulley to accommodate a longer band;

Fig. 4 is a side elevation of the machine;

Fig. 5 is a fragmentary vertical section taken on the line indicated at 5—5 in Fig. 4 and showing the pulley adjusting lever;

Fig. 6 is a section taken on the line indicated at 6—6 in Fig. 4 and showing the adjustable coupling by means of which the indexing mechanism can be advanced or retarded with respect to the punching mechanism;

Fig. 15 is a fragmentary plan view of the indexing mechanism;

Fig. 16 is a section through the crank disk taken on the line indicated at 16—16 in Fig. 15;

Fig. 17 shows the indexing mechanism in side elevation;

Fig. 18 is a plan view of the indexing mechanism showing the position of the parts at the beginning of the indexing stroke;

Fig. 19 is a fragmentary section taken on the line indicated at 19—19 in Fig. 18; and Fig. 20 is a section taken on the line indicated at 20—20 in Fig. 18.

Figure 7:
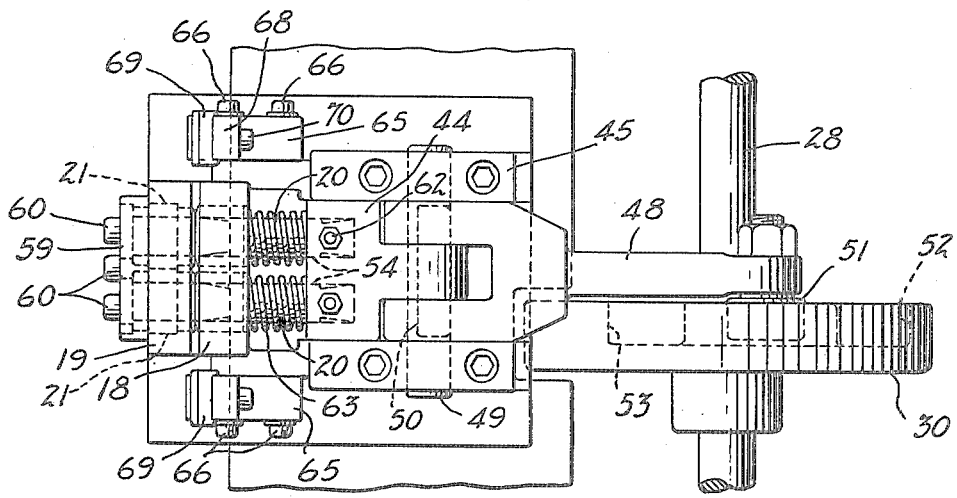
Fig. 7 is a fragmentary plan view of the punching mechanism.

As shown in Figs. 1 and 4, the machine of the present invention is mounted upon an elongated rigid frame 1, on the top of which are mounted cylindrical pulleys 2 and 3 that turn on vertical axes. The pulley 2 is rotatably mounted on a fixed vertical shaft 4 that projects upwardly from the top of the frame 1 and the pulley 3 is carried by a slide 5 that is mounted in a longitudinal way 6 on the frame 1, the pulley 3 being rotatably mounted in a vertical shaft 7 fixed to the slide 5. The pulley 3 is a tensioning pulley and tension is maintained upon an endless band B on the pulleys 2 and 3 by a counterweight 8 connected by a cable 9 to the slide 5. The way 6 extends longitudinally of the frame 1 and the cable 9 runs over a pulley 10 at the end of the frame.

To facilitate the placing of a band on the pulleys or removal of a band from the pulleys, means is provided for manually shifting the pulley 3 and for holding the same in a position where the tension on the band B is released. A hand lever 11 is connected to the frame 1 by a vertical pivot 12 and is engageable with a pin 13 on the slide 5 to move the slide 5 toward the pulley 2. The lever 11 slides on a supporting flange 14 that is provided with a retaining shoulder 15 with which the lever 11 engages to hold the pulley 3 in retracted position. After a band has been placed on the pulleys the lever 11 is lifted out of engagement with the shoulder 15 and the weight 8 pulls the slide 5 toward the end of the frame 1 to apply tension to the band. The pulley 2 is of larger diameter than the pulley 3 and has a band supporting flange 16 which has gear teeth cut therein. The pulley 3 has a band supporting flange 17 at its lower edge and the pulley 3 is so positioned that the flange 17 lies in substantially the same horizontal plane as the top face of the gear 16.

Guide members 18 and 19 are provided on the inner and outer sides of the front run of the band B and these guides serve to position punches 20 and dies 21 on opposite sides of the band, the band being supported between the punches and the dies with its top edge interposed between the punches and dies so that upon operation of the punches arcuate segments are removed from the edge of the band, thereby forming scallops of the desired width and depth. In order to aline the front run of the band with the guides 18 and 19, a guide pulley 22 having a band supporting flange 23 is provided adjacent the large pulley 2.

The pulleys 2 and 3 are designed to receive a band of a length commonly employed in band slicing machines. Some band slicing machines, however, require bands of greater length and, in order to accommodate such bands, an auxiliary pulley 24 is mounted on a slide 25 mounted for adjustment in a laterally extending horizontal way 26. The longer bands run over both the pulley 3 and the pulley 22 as shown in Fig. 3 and the pulley 22 may be adjusted to accommodate bands of various lengths.

For operating the machine an electric motor 27 is provided which drives a longitudinal shaft 28 through suitable reduction gearing in a housing 29. The shaft 28 has a punch operating cam 30 thereon and also drives a crank shaft 31 through helical gears 31 and 32. The pulley 2 is indexed by a ratchet mechanism operated by the crank shaft 31 during intervals between operations of the punches 20, the crank shaft being connected by a connecting rod 34 to a ratchet lever 35 which carries a pawl 36 that is engageable with the gear 16. The shaft 28 drives the indexing mechanism through an extension 28a that is connected in axial alinement with the shaft 28 by means of an adjustable coupling which permits angular adjustment of the extension 28a about its axis with respect to the shaft 28.

The coupling comprises disks 37 and 38 which are attached to the shaft 28 and extension 28a and which are secured together face to face by means of bolts 39 that pass through arcuate slots 40 in the disks 37 and 38. By means of the bolts 39 and slots 40 the shaft 28a may be turned forwardly or backwardly with respect to the shaft 28 to advance or retard the indexing mechanism with respect to the punch mechanism.

A cover plate 41 is provided on the frame beneath the pulley 3 and above the motor 27, the housing 29 and punches 20, and a similar cover 43 is provided over the indexing mechanism.

Figure 8:
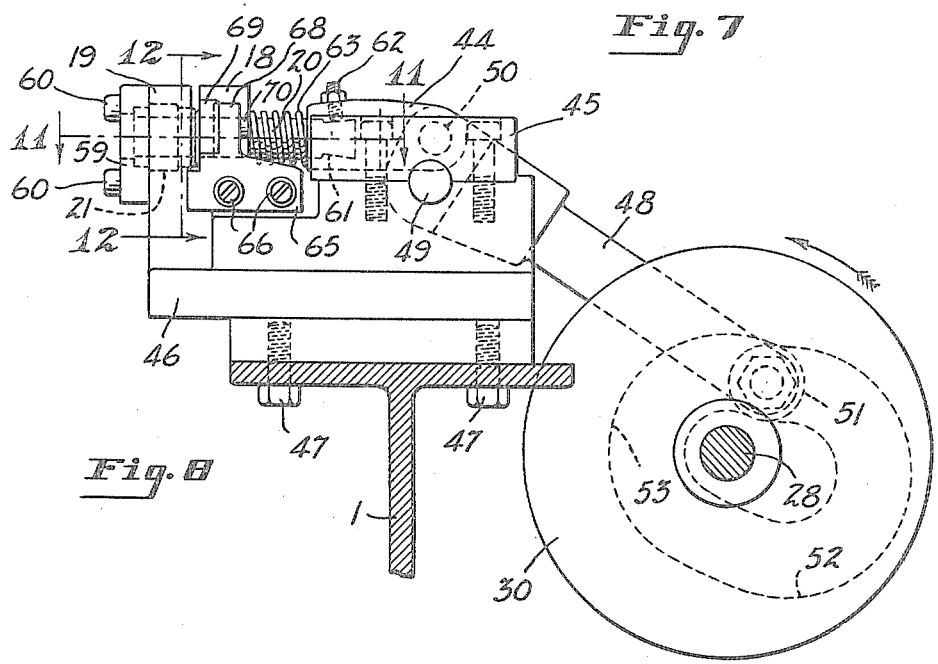
Fig. 8 is a vertical transverse section showing the punching mechanism in side elevation.
Figures 9, 10:
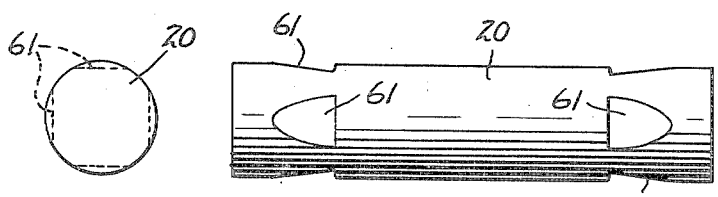
Fig. 9 is a side elevation of a punch.
Fig. 10 is an end elevation of a punch.
Figure 11:
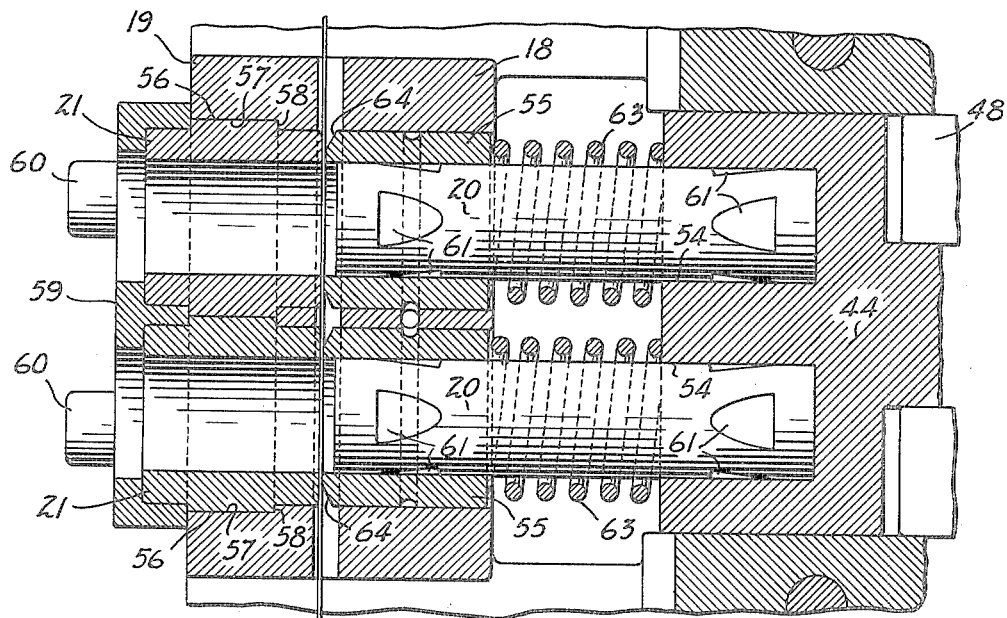
Fig. 11 is a horizontal section through the punch mechanism taken on the line indicated at 11—11 in Fig. 8.
Figures 12, 13:
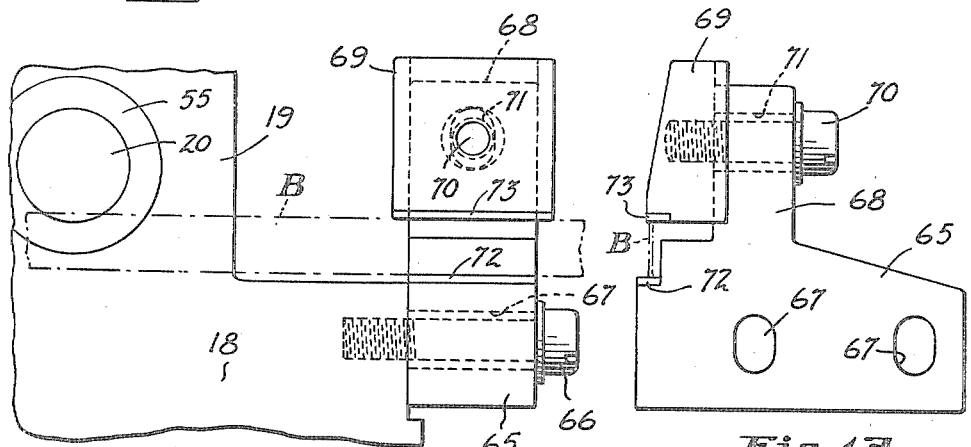
Fig. 12 is a fragmentary vertical section taken on the line indicated at 12—12 in Fig. 8.
Fig. 13 is a side elevation of one of the band guides adjacent the punches.

As shown in Figs. 7 and 8, the punches 20 are carried by a crosshead 44 mounted between transverse guides 45 on a supporting bracket 46 that is attached to the frame 1 by means of bolts 47. A short stroke is imparted to the crosshead 44 by means of an actuating lever 48 that is connected by a horizontal pivot 49 to the bracket 46 adjacent the crosshead 44 and which is connected to the head 44 by a horizontal pivot 50. At the lower end of the lever 48 there is a roller 51 which travels in a cam track 52 forming the face of the cam 30. The lever arm between the pivots 49 and 50 is quite short as compared with the length of the lever arm between the pivot 49 and the roller 51, so that the stroke of the punches is short and the force exerted on the lever by the cam is greatly multiplied in transmitting the short stroke to the head 44. The cam track 52 is formed with a portion 53 concentric with the shaft 28 so that during each revolution of the shaft 28 the head 44 dwells in its retracted position to permit operation of the indexing mechanism to advance the band after each punching operation.

The punches 20 are secured in parallel sockets 54 formed in the head 44 and the ends of the punches adjacent the dies 21 are guided in cylindrical sleeves 55 that have a sliding fit in the guide members 18. The dies 21 are internally cylindrical and of a size to receive the punches 20, the opposed faces of the dies and punches forming circular cutting edges. The dies 21 rotatably fit in openings in the outer guide members 19 and are provided with enlarged central portions 56 that fit in counterbores 57 in the guide member 19, shoulders 58 being provided at the inner ends of the counterbores 57 for positioning the dies. The dies 21 are secured in adjusted position by means of a cap 59 secured to the outer face of the guide member 19 by bolts 60, the cap 59 having recesses in which the outer ends of the dies fit. By loosening the cap 59 the dies 21 can be turned within the guide member 19 to any desired angular position, such adjustment being desirable because of the fact that only a segment of the circular cutting edge of the die is used in cutting the scallops in the band. By adjusting the dies to bring successive portions of the cutting edges to cutting position, the dies may be used for a much longer period without resharpening. The opposite ends of the dies are of identical form and the dies are reversible in their holders so that when the cutting edge at one end of the die becomes dull the die may be reversed to use the opposite end. Means is also provided for adjusting the punches 20 angularly about their axes to present different portions of their circular cutting edges to the work.

To enable the punches to be secured in different positions of angular adjustment, four equally spaced flats 61 are provided adjacent each end of each of the punches and these flats, which are spaced 90° apart, can be positioned for engagement by clamping screws 62 carried by the head 44. The flats 61 are preferably disposed at an angle to the punch axes so that the screws 62 which are disposed at right angles to the flats exert a thrust acting to press the punches against the bottoms of the sockets 54. The cutting edges of the punches are formed at the juncture of their end faces with the cylindrical periphery and, since both end faces are flat and perpendicular to the axis, the punches may be reversed when the cutting edge of one end becomes dull. Since the angular extent of the arcuate scallop is somewhat less than 90°, the four flats 61 provide an adjustment by which the four quadrants of the cutting edge may be successively placed in cutting position.

Coil springs 63 surrounding the punches 20 are interposed between the head 44 and the guide sleeves 55 which also serve as clamping rings to clamp the band B to the faces of the dies 21 during the punching operations. The movement of the slide toward the dies 21 increases the pressure exerted axially on the sleeves 55 so that the edge of the band is held securely against the die faces during the punching operation. To facilitate the insertion of the band into the space between the punches and the dies, the outer ends of the sleeves 55 have bevels 64 which enable the thin bands B to be readily inserted between the sleeves 55 and dies 21 when the band is being placed on the pulleys.

In order to accurately position the top edge of the band B with respect to the punches and dies, adjustable guides 65 are mounted on the bracket 46 adjacent the ends of the guide members 18. The guides 65 are adjustably secured to the bracket 46 by means of bolts 66 that extend through vertical slots 67 in the guides 65. Each of the guides 65 has an upwardly projecting flange 68 upon which a vertically adjustable guide member 69 is mounted, the guide member 69 being secured to the flange 68 by means of a bolt 70 passing through a vertical slot 71 in the flange 68. The band B is guided between the guide members 65 and 69, the guide member 65 being adjustable vertically to raise and lower the guide members 65 and 69 simultaneously to raise or lower the band with respect to the punches and the member 69 being adjustable vertically on the member 65 to accommodate bands of different widths. The portions of the members 65 and 69 engaging the top and bottom edges of the band B are preferably provided with wear resistant surfaces 72 and 73 which may be in the form of a strip of a tungsten carbide material such as Carboloy.

Figure 14:
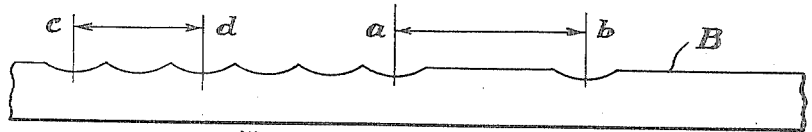
Fig. 14 is a fragmentary side elevation showing the scalloped edge of the slicer band at an intermediate stage of the process.

Since the scallops formed in the band conform to circular arcs of less than 90°, the punches are of a diameter considerably greater than the tooth spacing of the finished blade and it is necessary to space the punches apart a distance greater than one tooth space. Since the scallops must be uniformly spaced throughout the endless band, it is necessary that the indexing movement of the band be very accurate and it is for this reason desirable that the indexing movement be short. With two punches properly spaced the serrated cutting edge may be formed by a number of punching operations equal to one-half the total number of teeth or scallops in the finished band by indexing the band two tooth spaces after each punching operation. The punches could be spaced at various distances apart corresponding to a given number of band tooth spaces. However, in order to facilitate simultaneous operation of the punches, it is desirable to place them fairly close together so that they can be attached to a single slide. As herein illustrated, axes of the punches 20 are spaced apart three tooth spaces and cut scallops spaced as indicated at a—b in Fig. 14. After each punching operation the band B is indexed two tooth spaces as indicated at c—d in Fig. 14. Successive punching and indexing operations will form a continuous series of cutting teeth and scallops on the edge of the band and, if the band has an even number of scallops, the number of punching operations will be equal to one-half the number of scallops. A greater number of punches could be employed if desired and the spacing of the punches and the length of the indexing stroke could be proportioned to form the teeth in a lesser number of punching operations. However, the use of two punches with a relatively short indexing movement is preferred.

The indexing mechanism is designed to impart an accurately adjusted linear movement to the portion of the band being acted upon by the punches and to positively lock the pulley 2 during the punching operation.

As shown in Fig. 15, the pawl 36 is mounted on a plate 74 that is adjustable laterally on the ratchet lever 35. The plate 74 is connected at its inner end by a vertical pivot 75 to the lever 35 and is secured in adjusted position on the lever 35 by bolts 76 which are attached to the lever 35 and which pass through arcuate slots 77 in the plate 74. By angular adjustment of the plate 74 on the lever 35 the pawl 36 may be adjusted laterally on the lever. The pawl 36 is provided with a tooth 78 that is formed to fit in the spaces between the teeth of the gear 16. The gear 16 is preferably an accurately formed spur gear and it is desirable that the pawl 36 be accurately positioned with respect to the gear in order to provide proper engagement with the gear teeth. The pawl 36 is mounted on a vertical pivot 79 carried by the plate 74 and its tooth 78 is urged toward the gear 16 by a spring 80 attached at one end to the pawl and at the opposite end to the plate 74. During the punching operation the gear 16 is positively locked by a detent 81 formed to fit in the spaces between the teeth of the gear, the detent 81 being mounted on a slide 82 which moves radially with respect to the gear 61 in a way 83 formed in a supporting block 84 that is attached by bolts 85 to the frame 1. A spring 86 presses the slide 82 toward the gear 16 to hold the tooth 81 in locking position. The slide 82 is moved in opposition with the spring 86 to release the gear 16 by means of a cam bar 87 that is slidably mounted in the block 84 beneath the slide 82. The bar 87 moves endwise in a direction at right angles to the way 83 and is provided on its outer edge with a V-notch 88 that engages with a roller 89 on a pin 90 that it attached to the slide 82 and projects downwardly therefrom. The bar 87 is actuated by the lever 35 through a link 91 that is connected to the lever 35 by a vertical pivot pin 92, the link 91 having a slot 93 that receives the pin 92 and that provides a lost motion connection between the lever 35 and the bar 87.

When the lever 35 is in the position shown in Fig. 15, the roller 89 is received in the notch 88 of the bar 87 and the detent 81 is in engagement with the gear 16, locking the gear against turning movement. In the position shown in Fig. 15 the lever 35 is at the end of its indexing stroke and upon continued turning movement of the cam shaft 31 the lever will be moved outwardly toward its retracted position shown in Fig. 18. During the initial portion of the retracting movement of the lever 35 the pin 92 moves in the slot 93 of the link 91 and no movement is imparted to the cam bar 87. When the pin 92 reaches the outer end of the slot 93 the bar 87 is actuated and the slide 82 is retracted to release the gear 16. Upon a return movement from the position shown in Fig. 18 toward the position shown in Fig. 15 the pin 92 moves in the slot 93 and no movement is imparted to the bar 87 until the pin engages the inner end of the slot 93, so that the detent 81 will be held out of engagement with the gear until the lever 35 is near the end of its indexing stroke. The adjustment of the plate 74 enables the pawl 36 to be adjusted with respect to the detent 81 so that the teeth 78 and 81 will properly register with the spaces between the teeth of the gear.

In order to vary the length of the indexing stroke, the connecting rod 34 is connected to the crank shaft 31 by means of a crank disk 94 provided with a radial way 95 which receives a slide 96 that carries a pin 97 which forms a pivot for the inner end of the rod 34. The length of the stroke imparted to the ratchet lever 35 can be varied by adjusting the slide 96 in the way 95 and, in order to secure the slide 96 in adjusted position, screws 98 are provided in the disk 94.

It is to be understood that in accordance with the provisions of the patent statutes, variations and modifications of the specific devices herein shown and described may be made without departing from the spirit of the invention.

What we claim is:

1. The herein described method of forming equally spaced cutting teeth and intermediate scallops throughout an edge of an endless flexible hard steel band, which comprises punching a plurality of scallops in an edge of the band that are spaced apart a distance corresponding to an odd plurality of tooth spaces, and punching identically spaced scallops in each of a series of subsequent punching operations, the scallops punched in successive punching operations being respectively spaced equally from scallops punched in a previous operation a distance corresponding to two tooth spaces spaced scallops from the distance between said identically spaced scallops, and said punching operations being continued until cutting teeth and intermediate scallops are formed throughout the edge of said band.

2. A machine for forming spaced teeth and intermediate scallops in an edge of an endless flexible metal band, a support, a pair of spaced cylindrical pulleys mounted above the top of said support to rotate about vertical axes, a slide carrying one of said pulleys mounted in said support for movement toward and away from the other pulley, means exerting a yielding thrust on said slide to tension a band on said pulleys, a lever engageable with said slide to move the same in a direction to relieve the tension on the band to enable a band to be removed from or placed on said pulleys, an internally cylindrical die mounted on said support between said pulleys with its axis horizontal and having a front face perpendicular to its axis, means for guiding and intermittently driving the band along the front face of said die with an edge thereof covering a segment of the die opening, a punch formed to fit said die and mounted coaxially therewith for movement into and out of engagement with the edge of the band extending across a portion of the die opening, a clamping member associated with the punch for clamping said band against said die face, and means for actuating said punch and clamping member during each dwell of said band to form cutting teeth and intermediate scallops throughout the edge of said blade.

3. A machine for forming scallops in an edge of an endless flexible metal band comprising a support, a horizontally movable slide on said support, a fixed cylindrical pulley mounted on said support for rotation about a vertical axis, a movable cylindrical pulley mounted on said slide for rotation about a vertical axis, a counterweight connected to said slide for tensioning a band on said pulleys, a lever engageable with said slide to move the same in a direction to relieve band tension to facilitate removal of a band from the pulleys or the mounting of a band on the pulleys, scallop forming means between said pulleys comprising a die and a punch having coacting cutting edges, said die having a flat front face, means for guiding said band across said front face between the die and punch with an edge thereof disposed between said cutting edges, means operable intermittently for clamping said band against said face and for actuating said punch, and means operating during the intervals between actuations of said punch for imparting a predetermined turning movement to one of said pulleys to advance the band with respect to the punch for forming cutting teeth and intermediate scallops throughout the edge of said blade.

4. A machine for forming cutting teeth and intermediate scallops in an edge of a relatively thin metal strip comprising an internally cylindrical die having a front face perpendicular to its axis to provide a circular cutting edge, a punch formed to fit in said die and mounted coaxially with the die for movement toward and away from said front face, said punch having a circular cutting edge at the margin of its front face, means for clamping said strip against the front face of said die with an edge thereof overlying the die opening, means for actuating said punch to sever an arcuate segment from the edge of said strip, and means for adjusting said die and punch angularly about said axis to aline different predetermined segments of their cutting edges with the edge portion of the steel strip and for positively securing said punch in different positions of angular adjustment.

5. A machine for forming cutting teeth and intermediate scallops in an edge of a relatively thin metal strip comprising an internally cylindrical die having a front face perpendicular to its axis to provide a circular cutting edge, a punch formed to fit in said die and mounted coaxially with the die for movement toward and away from said front face, said punch having a circular cutting edge at the margin of its front face, means for clamping said strip against the front face of said die with an edge thereof overlying the die opening, means for actuating said punch to sever an arcuate segment from the edge of said strip, a holder for said die in which said die may be turned about its axis, means for positively securing said die in different positions of angular adjustment in its holder, a holder for said punch in which said punch may be turned about its axis, and means for positively securing said punch in different predetermined positions of angular adjustment in its holder.

6. A machine for forming cutting teeth and intermediate scallops in an edge of a relatively thin metal strip comprising a die holder and a punch holder mounted for relative linear movement one toward and away from the other, an internally cylindrical die rotatably mounted in said die holder with its axis disposed in the direction of said linear movement, a cylindrical punch formed to fit said die and rotatably mounted in said punch holder coaxially with said die, means for positively securing said die in its holder in different predetermined positions of angular adjustment, and means for positively securing said punch in its holder in different predetermined positions of angular adjustment.

7. A machine for forming cutting teeth and intermediate scallops in an edge of a relatively thin metal strip comprising a die holder and a punch holder mounted for relative linear movement one toward and away from the other, an internally cylindrical die rotatably mounted in said die holder with its axis disposed in the direction of said linear movement, said die having flat end faces providing circular cutting edges and being reversibly mounted in its holder, a cylindrical punch formed to fit said die and rotatably mounted in said punch holder coaxially with said die, said punch having identical end faces providing circular cutting edges and being reversibly mounted in its holder, and means for positively securing said punch and said die in different predetermined positions of angular adjustment in their holders.

8. A machine for forming cutting teeth and intermediate scallops with a uniform selected tooth spacing throughout an edge of an endless flexible metal band comprising a support for said band including spaced rotatable pulleys over which the band runs, a pair of spaced internally cylindrical dies alongside a run of said band, a cylindrical punch formed to fit each die and mounted in axial alinement with its die for movement into and out of the die, means for guiding the band between the punches and dies with one edge thereof overlapping the die openings, means for actuating said punches and for simultaneously clamping said band to said dies immediately adjacent the die openings, said actuating and clamping being timed so that the band is clamped to said dies before being engaged by said punches, and said dies being spaced apart a distance corresponding to an odd plurality of said tooth spaces, and indexing means for advancing said band a distance corresponding to two tooth spaces with respect to said punches between actuations of said punches to form cutting teeth and intermediate scallops throughout said edge of said band.

9. A machine for forming cutting teeth and intermediate scallops in an edge of an endless flexible metal band of hard steel, comprising a support, two spaced cylindrical pulleys mounted to rotate about vertical axes for supporting said band for horizontal travel, means for tensioning said band, scallop forming means comprising a die and a punch mounted on said support between said pulleys, said punch and die having scallop forming cutting edges, said punch being mounted for movement into and out of engagement with the die, means for guiding and intermittently driving said band between the punch and die with an edge thereof between the cutting edges of the punch and die, and means for clamping said band to said die face immediately adjacent the cutting edge of the die and for moving said punch into engagement with said die while the band is so clamped during each dwell of said band to form cutting teeth and intermediate scallops throughout the edge of said blade.

(References on following page)

References Cited in the file of this patent

UNITED STATES PATENTS

| | | |
|---|---|---|
| 64,197 | Clark | Apr. 30, 1867 |
| 350,968 | Blackmer | Oct. 19, 1886 |
| 357,681 | Maxwell | Feb. 15, 1887 |
| 388,977 | Hulme | Sept. 4, 1888 |
| 396,553 | Fowle | Jan. 22, 1889 |
| 928,256 | Grissom | July 20, 1909 |
| 1,452,308 | Miller | Apr. 17, 1923 |
| 1,494,995 | Craddock | May 20, 1924 |
| 1,678,319 | Blessing | July 24, 1928 |
| 1,728,192 | Wellington | Sept. 17, 1929 |
| 1,854,254 | Gray | Apr. 19, 1932 |
| 1,917,353 | Bailey | July 11, 1933 |
| 2,325,230 | Crane | July 27, 1943 |
| 2,476,292 | Guay | July 19, 1949 |
| 2,510,301 | Wiegand | June 6, 1950 |
| 2,537,540 | Messenger | Jan. 9, 1951 |